(12) United States Patent
Ge et al.

(10) Patent No.: US 8,439,224 B2
(45) Date of Patent: May 14, 2013

(54) PROTECTIVE COVER MECHANISM

(75) Inventors: Peng-Jin Ge, Shenzhen (CN); Yu-Fei Chen, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 464 days.

(21) Appl. No.: 12/835,836

(22) Filed: Jul. 14, 2010

(65) Prior Publication Data
US 2011/0173894 A1  Jul. 21, 2011

(30) Foreign Application Priority Data
Jan. 15, 2010  (CN) .......................... 2010 1 0300328

(51) Int. Cl.
*B65D 43/14* (2006.01)
(52) U.S. Cl.
USPC ......... 220/843; 220/810; 220/845; 220/254.3
(58) Field of Classification Search ............... 220/254.3, 220/254.5, 810, 831, 832, 843, 845
See application file for complete search history.

(56) References Cited

U.S. PATENT DOCUMENTS

| 3,113,692 | A | * | 12/1963 | Di Pierro | 220/840 |
| 3,297,192 | A | * | 1/1967 | Swett | 220/840 |
| 5,048,715 | A | * | 9/1991 | Wolff | 220/832 |
| 6,967,832 | B2 | * | 11/2005 | Mariano | 361/679.27 |

* cited by examiner

*Primary Examiner* — Anthony Stashick
*Assistant Examiner* — James N Smalley
(74) *Attorney, Agent, or Firm* — Altis Law Group, Inc.

(57) ABSTRACT

A protective cover mechanism includes a housing, a protective cover and a latching piece. The housing includes an opening defined therethrough. The latching piece is assembled to the housing adjacent to the opening and comprises two holding arms. One holding arm defines a first locating portion and a second locating portion. A protective cover comprises a hinged post formed thereon, the protective cover is rotatably assembled to the housing by means of the latching piece with the hinged post held between the two holding arms. The protective cover is configured for selectively covering or exposing the opening of the housing as the hinged post is rotated from the first locating portion to the second locating portion.

11 Claims, 5 Drawing Sheets

PROTECTIVE COVER MECHANISM

CROSS-REFERENCE TO RELATED APPLICATION

The application Ser. No. 12/835,836 in turn claims the benefit of priority under 35 USC 119 from Chinese Patent Application 201010300328.7, filed on Jan. 15, 2010.

TECHNICAL FIELD

This exemplary disclosure generally relates to protective cover mechanisms used with electronic devices.

DESCRIPTION OF RELATED ART

Portable electronic devices such as mobile phones and personal digital assistants (PDAs) are now widely used. Many portable electronic devices include a touch screen and a touch stylus. The portable electronic device usually defines an accommodating hole to receive the stylus.

However, when the stylus is taken out for use, the accommodating hole is exposed to the outside, allowing contaminants such as dust and moisture to enter. The contaminants could negatively affect the performance of the portable electronic device.

Therefore, there is room for improvement within the art

BRIEF DESCRIPTION OF THE DRAWINGS

Many aspects of the exemplary protective cover mechanism can be better understood with reference to the following drawings. The components in the various drawings are not necessarily drawn to scale, the emphasis instead being placed upon clearly illustrating the principles of the exemplary protective cover mechanism. Moreover, in the drawings, like reference numerals designate corresponding parts throughout the diagrams.

DETAILED DESCRIPTION

In this exemplary embodiment, the protective cover mechanism is applied to a portable electronic device such as a mobile telephone. The mobile telephone described herein is a representation of the type of portable electronic device that may benefit from the exemplary embodiment. However, it is to be understood that the exemplary embodiment may be applied to any type of hand-held or portable device including, but not limited to, the following devices: radiotelephones, cordless phones, personal digital assistants, and the like. Accordingly, any reference herein to the mobile telephone should also be considered to apply equally to other portable electronic devices.

Figure 1:
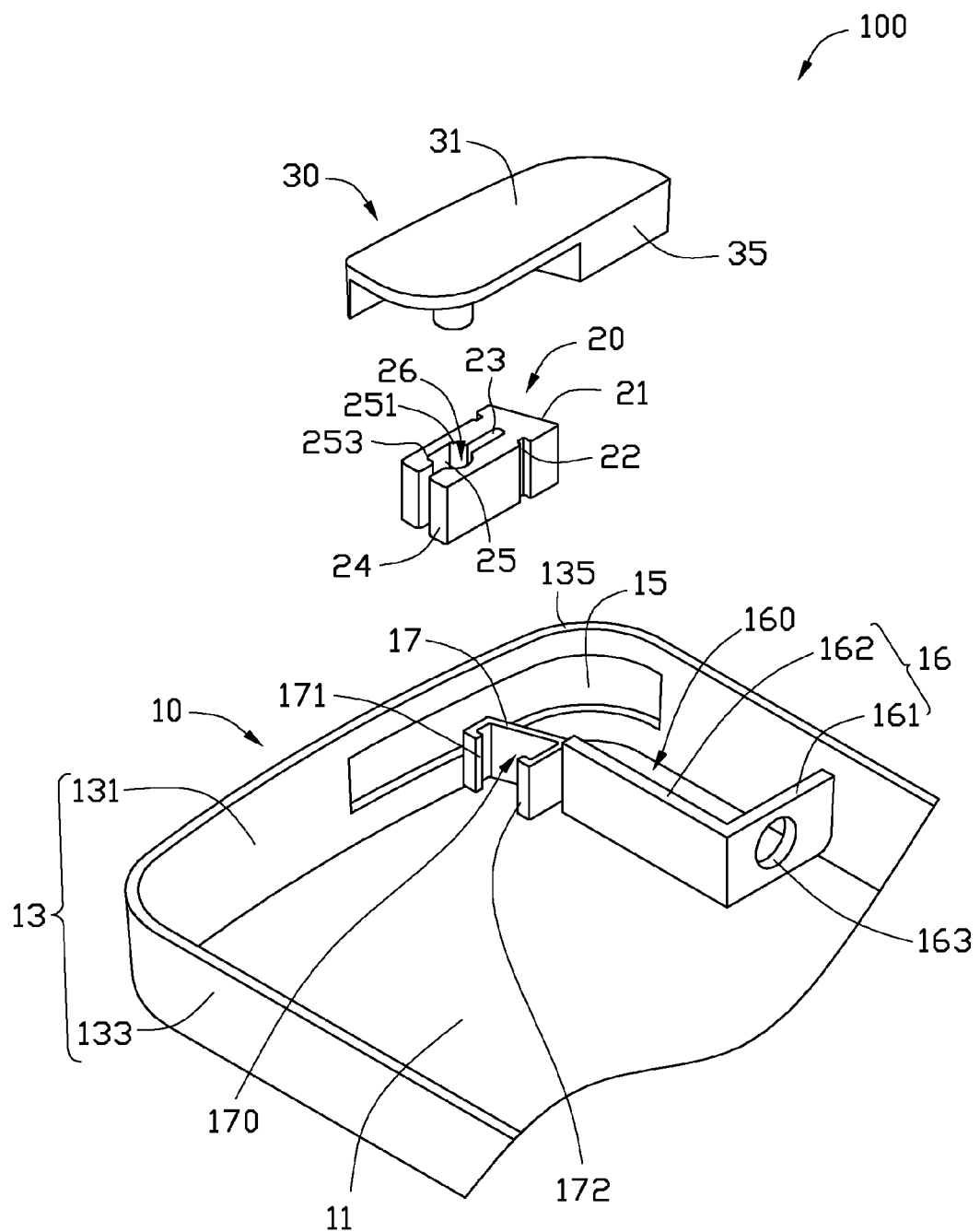
FIG. 1 shows an exploded perspective view of the protective cover mechanism, in accordance with an exemplary embodiment.

FIG. 1 shows an exploded perspective view of a protective cover mechanism 100 including a housing 10, a latching piece 20 and a protective cover 30. The housing 10 can be a back housing or a main body of a portable electronic device. The housing 10 includes a base wall 11, a peripheral wall 13 and a holding portion 16 and a latching portion 17. The peripheral wall 13 substantially perpendicularly extends from the peripheral edge of the base wall 11. The peripheral wall 13 includes an end wall 131 substantially perpendicularly extending from an end portion of the base wall 11 and two side walls 133 substantially perpendicularly extending from two sides of the base wall 11 and connecting the two ends of the end wall 131. The peripheral wall 13 forms two corner portions 135 adjacent to the two ends of the end wall 131.

An opening 15 is defined through one corner portion 135 of the peripheral wall 13 for inserting an accessory of the portable electronic device such as a stylus (not shown). In other embodiments, the opening 15 can be for exposing an external interface (e.g., universal serial bus (USB) or a port for electrically connecting with external devices (e.g., printers), accessories (e.g., USB flash drives) or other electronic devices.

The holding portion 16 is formed adjacent to the opening 15 of the corner portion 135 of the housing 10, thereby forming a receiving space 160 together with the base wall 11 and the corner portion 135. The holding portion 16 is a substantially L-shaped board extending substantially perpendicularly from the base wall 11. One end of the holding portion 16 connects with the adjacent side wall 133, and the other end of the holding portion 16 is located substantially adjacent to the end wall 131. In this present embodiment, the holding portion 16 includes a first holding board 161 substantially parallel to the end wall 131 and a second holding board 162 connecting substantially perpendicularly with the first holding board 161 and substantially parallel to the side wall 133. The distal end of the first holding board 161 substantially perpendicularly connects with the adjacent side wall 133. The distal end of the second holding board 162 is spaced from the end wall 131 and a gap is formed (not illustrated) between the end wall 131 and the distal end of the second holding board 162. The first holding board 161, the second holding board 162, the base wall 11, the end wall 131 and the adjacent one side wall 133 cooperatively define a receiving space 160. The first holding board 161 defines a through hole 163 opposite to the opening 15.

The latching portion 17 is defined within the gap between the end wall 131 and the distal end of the second holding board 162. The latching portion 17 is configured for assembling and latching with the latching piece 20. In this present embodiment, the latching portion 17 is substantially T-shaped defining a T slot 170 and includes a first latching end 171 and an opposite second latching end 172.

The latching piece 20 is detachably assembled to the latching portion 17 and configured for rotatably mounting with the protective cover 30, so that the protective cover 30 can be rotatably assembled to the housing 10 to selectively cover the opening 15 or expose the opening 15 to the outside. The latching piece 20 may be made of a resilient material such as plastic or rubber. The latching piece 20 includes a T latch 21, two latching slots 22 and two holding arms 24. The T latch 21 has substantially the same size and shape as the T slot 170 of the latching portion 17, such that the T latch 21 can be tightly engaged within the T slot 170 of the latching portion 17. The two latching slots 22 are defined in two opposite sides of the latching piece 20 substantially adjacent to the T latch 21 and are configured for respectively latching with the first latching end 171 and the second latching end 172 of the latching portion 17. The two holding arms 24 substantially parallelly extend away from the T latch 21 of the latching piece 20, thereby forming a groove 23 between the two holding arms 24. Each holding arm 24 defines a receiving slot 25 in the opposite inner surface, adjacent to the distal end of the two holding arms 24. The holding arms 24, the receiving slots 25, and the groove 23 cooperatively form an assembling space 26 for assembling the protective cover 30. One receiving slot 25 includes a first locating portion 251 formed adjacent to the T latch 21 and an opposite second locating portion 253 formed adjacent to the distal end of the holding arm 24

Figure 2:
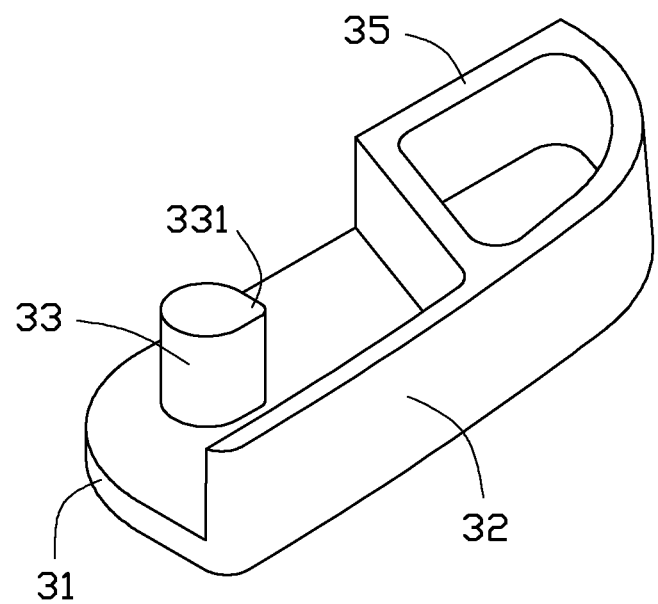
FIG. 2 shows a perspective view of the protective cover shown in FIG. 1, in accordance with an exemplary embodiment.

Referring also to FIG. 2, the protective cover 30 is rotatably assembled to the housing 10 with the latching piece 20, and can be received within the receiving space 160 to cover the opening 15 of the housing 10 or be opened to expose the opening 15 to the outside. The protective cover 30 includes a base body 31, a covering wall 32 and a hinged post 33. The covering wall 32 perpendicularly extends from the base body 31 and has substantially the same size and shape as the opening 15 of the housing 10. When the protective cover 30 is assembled to the housing 10, the covering wall 32 can be received and sealed within the opening 15 of the housing 10. The hinged post 33 protrudes from the base wall 31 and is positioned at the same side with the covering wall 32. The hinged post 33 is substantially cylindrical with substantially the same size and shape as the assembling space 26 of the latching piece 20. A rib portion 331 protrudes from the outer peripheral of the hinged post 33. A resisting portion 35 protrudes from the base wall 31, opposite to the hinged post 33.

Figure 3:
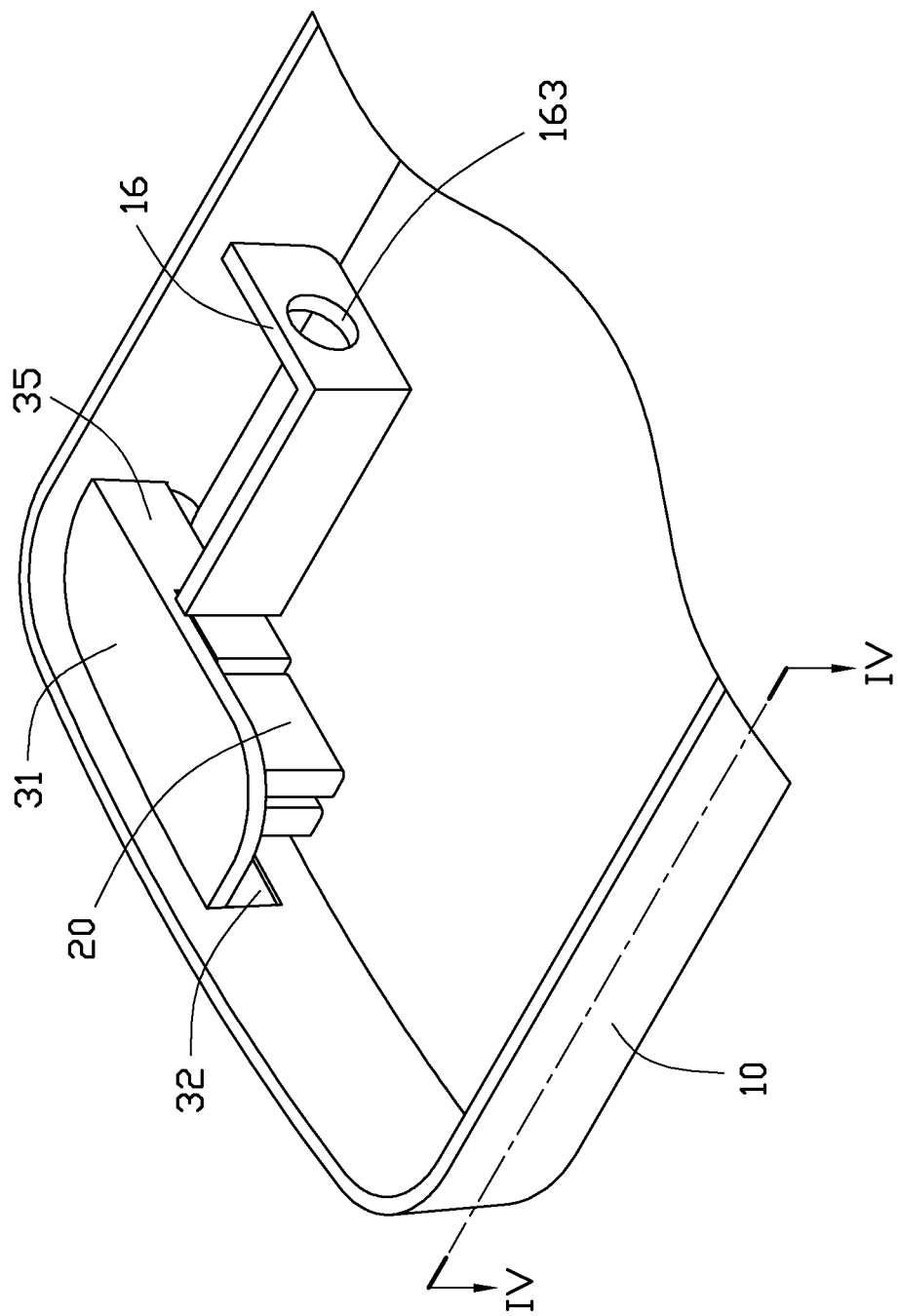
FIG. 3 shows an assembled perspective view of the protective cover mechanism, in accordance with an exemplary embodiment.
Figure 4:
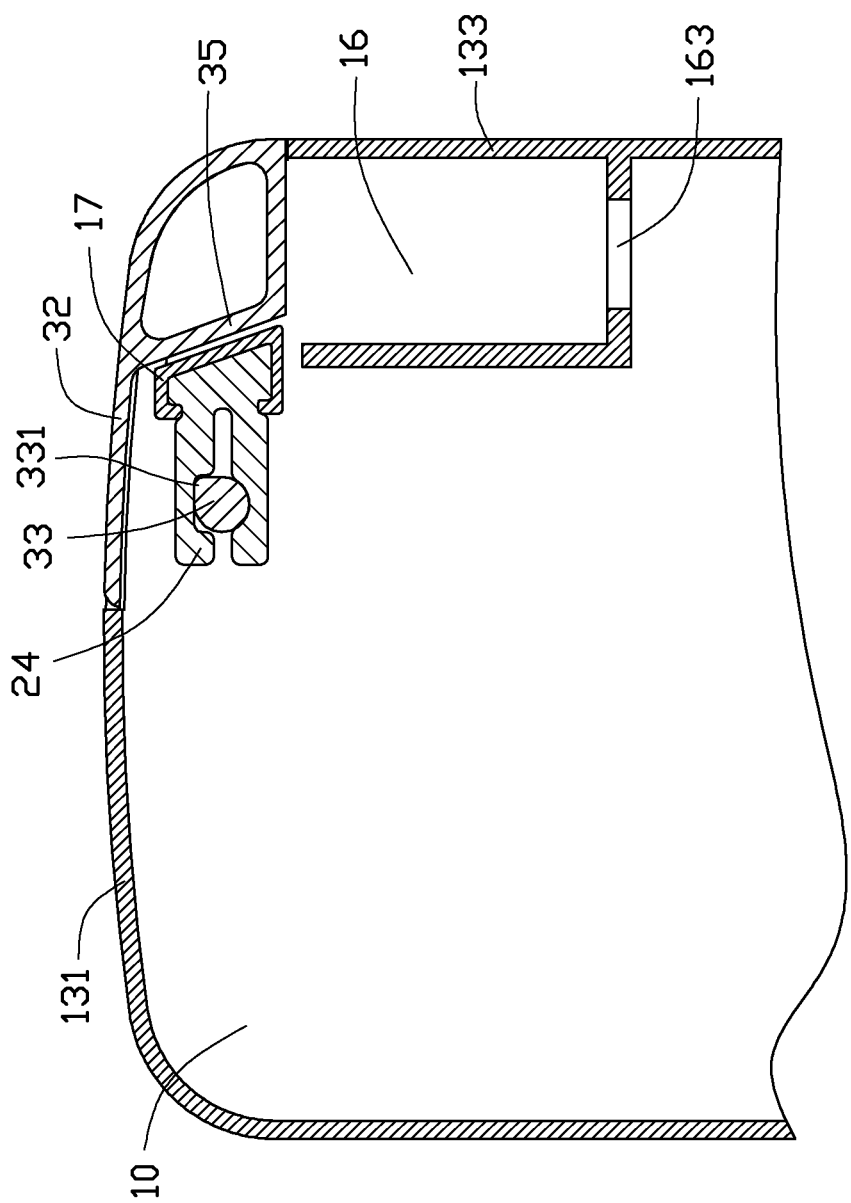
FIG. 4 shows a cross-sectional view of the protective cover mechanism, wherein, the cover is in a closed state.

Referring to FIGS. 3 and 4, to assemble the protective cover mechanism 100, the latching piece 20 is assembled to the latching portion 17, and the T latch 21 engages into the T slot 170. The first latching end 171 and the second latching end 172 latch into the two latching slots 22. The protective cover 30 is rotatably connected to the housing 10 for covering the opening 15. The hinged post 33 is inserted into and is rotatably assembled within the assembling space 26. The two holding arms 24 elastically hold the hinged post 33. The protective cover 30 is rotated towards the opening 15 of the housing 10 until the cover wall 32 of the protective cover 30 is completely accommodated within the opening 15. The rib portion 331 of the hinged post 33 is rotated to resist against the corresponding first locating portion 251. The cover wall 32 of the protective cover 30 is accommodated within the opening 15 of the peripheral wall 13 for covering the opening 15.

Figure 5:
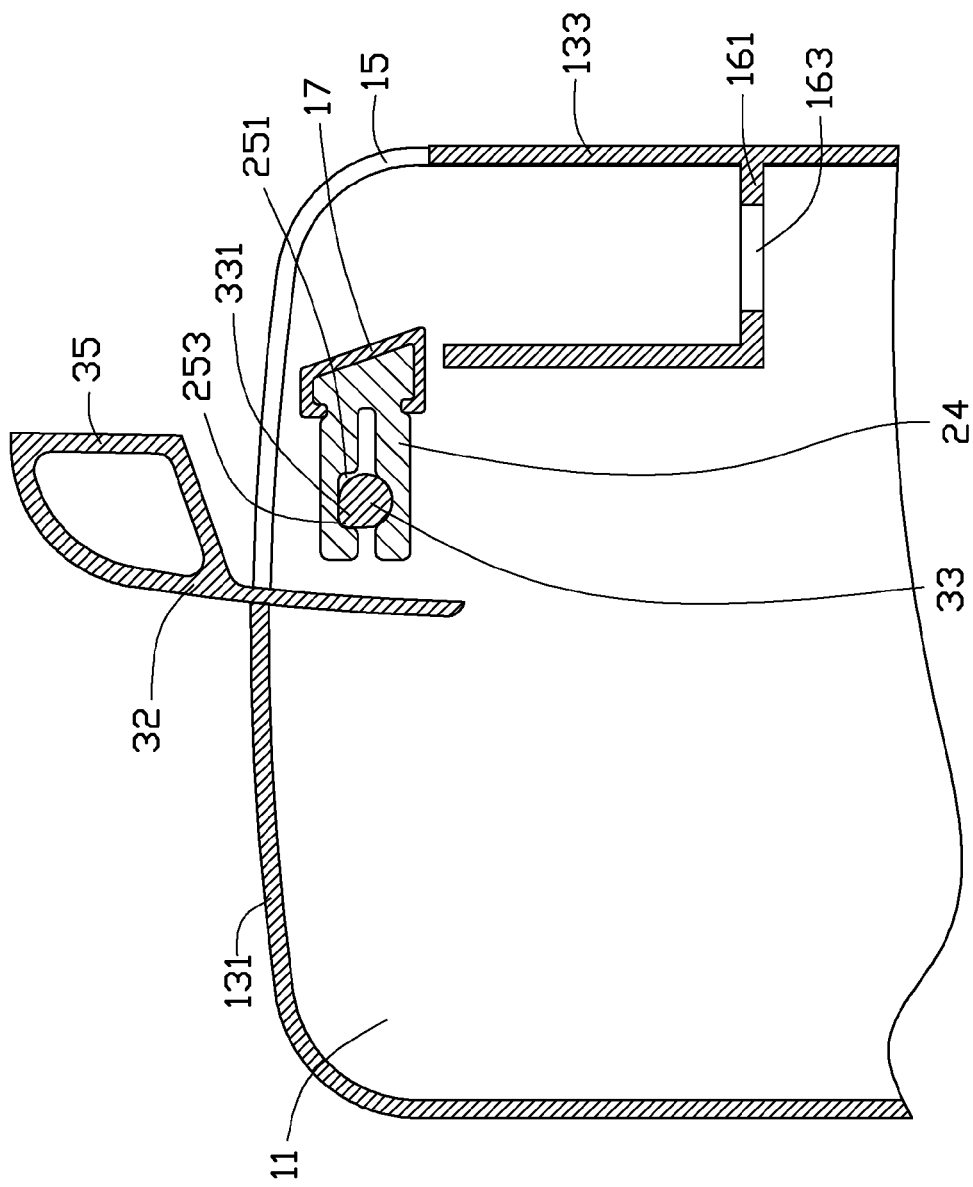
FIG. 5 shows a cross-sectional view of the protective cover mechanism, wherein, the cover is in an open state.

Referring also to FIG. 5, to release the protective cover 30 for exposing the opening 15, the protective cover 30 is rotated away from the housing 10. The hinged post 33 is rotated relative to the latching piece 20 and the rib portion 331 is rotated toward and resists on the second locating portion 253. The opening 15 of the housing 10 is exposed, facilitating an easy removal of stylus from the housing 10 or allowing the stylus to be attached to the housing 10.

It is to be understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:
1. A protective cover mechanism, comprising:
 a housing having an opening defined therethrough;
 a latching piece mounted to the housing adjacent to the opening and comprising two holding arms; and
 a protective cover comprising a hinged post formed thereon, the protective cover rotatably assembled to the housing by the hinged post being rotatably held between the two holding arms; the protective cover configured for selectively covering or exposing the opening of the housing with rotation of the hinged post relative to latching piece;
 wherein each holding arm defines a receiving slot therein opposite to each other and together form an assembling space with the two holding arms, for rotatably assembling and receiving the hinged post therein, and one holding arm defines a first locating portion and a second locating portion within the receiving slot; the hinged post includes a rib portion protruding from the outer peripheral thereof and configured to selectively resist on the corresponding first locating portion and the second locating portion respectively as the protective cover being rotated relative to the housing.

2. The protective cover mechanism as claimed in claim 1, wherein the two holding arms are parallel to each other thereby forming a groove therebetween, the first locating portion and the second locating portion are formed at the two ends of the receiving slot.

3. The protective cover mechanism as claimed in claim 1, wherein the housing includes a latching portion disposed adjacent to the opening, the latching piece is made of elastic material and further includes a T latch detachably latched to the latching portion of the housing.

4. The protective cover mechanism as claimed in claim 3, wherein the latching portion is substantially T-shaped defining a T slot and includes a first latching end and an opposite second latching end; the latching piece further includes two latching slots oppositely defined in two sides of the latching piece adjacent to the T latch; the first latching end and the second latching end of the latching portion latch with the corresponding two latching slots of the latching piece respectively.

5. The protective cover mechanism as claimed in claim 4, wherein the housing further includes a base wall and a peripheral wall extending from the peripheral edge of the base wall; the opening is defined through one corner portion of the peripheral wall; the protective cover further includes a base body and a covering wall extending from the peripheral of the base body with substantially the same size and shape as the opening of the housing, the hinged post protrudes from the base wall adjacent to one end thereof and is positioned at the same side with the covering wall.

6. The protective cover mechanism as claimed in claim 5, wherein the protective cover further includes a resisting portion protruding from the base wall adjacent to the one end thereof and opposite to the hinged post; as the protective cover is closed to cover the opening of the housing, the resisting portion abuts on the corresponding latching portion.

7. The protective cover mechanism as claimed in claim 5, wherein the peripheral wall includes an end wall and two side walls connecting the two ends of the end wall; the housing further includes a holding portion disposed adjacent to the corner portion thereof, the holding portion includes a first holding board parallel to the end wall and a second holding board connects with the first holding board and substantially parallel to the side wall; the distal end of the second holding board is defined spaced to the end wall by forming a gap therebetween; the latching portion is disposed within the gap between the end wall and the distal end of the second holding board.

8. A protective cover mechanism, comprising:

a housing having an opening defined therethrough;

two holding arms formed on the housing and one holding arm defining a first locating portion and a second locating portion; and a protective cover rotatably assembled to the housing and comprising a hinged post formed thereon; the hinged post held between the two holding arms, and configured to rotate relative to the holding arm from the first locating portion to the second locating portion; such that, the protective cover being selectively covering the opening of the housing or opened to expose the opening of the housing;

wherein the protective cover further includes a base body and a covering wall extending from the peripheral of the base body with substantially the same size and shape as the opening of the housing, the hinged post and the covering wall extend from the same surface of the base body, and the protective cover mechanism further includes a latching piece assembled to the housing adjacent to he opening, the latching piece includes a T latch, the two holding arms extend out away from the T latch, thereby, forming a groove spaced therebetween; the hinged post of the protective cover is received in the groove and elastically held by the two holding arms.

9. The protective cover mechanism as claimed in claim 8, wherein the hinged post includes a rib portion protruding from the outer peripheral thereof, each holding arm defines a receiving slot therein opposite to each other thereby forming an assembling space together; the hinged post is rotatably assembled with in the assembling space, the rib portion selectively resist on corresponding first locating portion or the second locating portion.

10. The protective cover mechanism as claimed in claim 8, wherein the housing further includes a latching portion disposed adjacent to the opening, the T latch of the latching piece is latched to latching portion of the housing.

11. The protective cover mechanism as claimed in claim 10, wherein the latching portion is substantially T-shaped and includes a first latching end and an opposite second latching end; the latching piece further includes two latching slots oppositely defined in two sides of the latching piece adjacent to the T latch; the first latching end and the second latching end of the latching portion latch with the corresponding two latching slots of the latching piece respectively.

* * * * *